United States Patent
Baita et al.

(10) Patent No.: US 7,786,254 B2
(45) Date of Patent: Aug. 31, 2010

(54) PROCESS FOR THE POLYOLEFIN FINISHING

(75) Inventors: Pietro Baita, Rovigo (IT); Giuseppe Penzo, Mantova (IT); Gabriele Mei, Ferrara (IT)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 12/309,894

(22) PCT Filed: Aug. 1, 2007

(86) PCT No.: PCT/EP2007/057953
§ 371 (c)(1),
(2), (4) Date: Feb. 2, 2009

(87) PCT Pub. No.: WO2008/015228
PCT Pub. Date: Feb. 7, 2008

(65) Prior Publication Data
US 2010/0004408 A1    Jan. 7, 2010

Related U.S. Application Data

(60) Provisional application No. 60/839,803, filed on Aug. 24, 2006.

(30) Foreign Application Priority Data
Aug. 3, 2006    (EP) .................................... 06118423

(51) Int. Cl.
*C08F 6/00*    (2006.01)
*C08F 2/34*    (2006.01)

(52) U.S. Cl. .................. 528/483; 528/498; 528/500

(58) Field of Classification Search ................. 528/483, 528/498, 500
See application file for complete search history.

(56) References Cited

U.S. PATENT DOCUMENTS

| 4,017,445 | A |   | 4/1977  | Grosse-Wortmann et al. |
|-----------|---|---|---------|------------------------|
| 4,332,933 | A | * | 6/1982  | Di Drusco et al. .......... 528/500 |
| 5,071,950 | A | * | 12/1991 | Borho et al. ............... 528/483 |
| 5,376,742 | A |   | 12/1994 | Krause |
| 5,521,264 | A |   | 5/1996  | Mehra et al. |
| 5,691,445 | A |   | 11/1997 | Krupinski et al. |
| 5,698,642 | A |   | 12/1997 | Govoni et al. |

(Continued)

FOREIGN PATENT DOCUMENTS

EP    683176    11/1995

(Continued)

*Primary Examiner*—Fred M Teskin
(74) *Attorney, Agent, or Firm*—Yuanzhang Han; Jarrod N. Raphael (57) ABSTRACT

A process to perform the finishing of polyolefins produced by gas-phase catalytic polymerization of one or more α-olefins in the presence of a polymerization diluent selected from a $C_3$-$C_5$ alkane, wherein the polyolefin granules discharged from the gas-phase reactor are subjected to: (1) a first degassing step in which said polyolefin is counter-currently contacted with a gaseous stream containing at least 85% by mol of a stripping agent selected from a $C_3$-$C_5$ alkane, said gaseous stream being continuously derived from the monomer recovery section of the polymerization plant; (2) a second degassing step in which said polyolefin is counter-currently contacted with steam, the amount of steam being from 10 to 200 Kg per 1000 kg of polyolefin.

19 Claims, 1 Drawing Sheet

U.S. PATENT DOCUMENTS

| | | | |
|---|---|---|---|
| 5,789,501 A | 8/1998 | Chapman et al. | |
| 5,990,272 A | 11/1999 | Yamamoto et al. | |
| 6,218,504 B1 | 4/2001 | Dolle et al. | |
| 6,413,477 B1 | 7/2002 | Govoni et al. | |
| 6,689,845 B1 | 2/2004 | Govoni et al. | |
| 6,818,187 B2 | 11/2004 | Govoni et al. | |
| 7,037,998 B2 | 5/2006 | Ohtani et al. | |
| 7,157,540 B2 | 1/2007 | Ohtani et al. | |
| 7,223,711 B2 | 5/2007 | Sacchetti et al. | |
| 7,582,710 B2 | 9/2009 | Bell et al. | |
| 7,582,723 B2 * | 9/2009 | Penzo et al. | 528/483 |
| 7,592,286 B2 | 9/2009 | Morini et al. | |
| 2004/0242810 A1 * | 12/2004 | Bell et al. | 526/68 |

FOREIGN PATENT DOCUMENTS

| | | |
|---|---|---|
| EP | 782587 | 7/1997 |
| EP | 798314 | 10/1997 |
| EP | 808850 | 11/1997 |
| EP | 838318 | 4/1998 |
| EP | 1012195 | 6/2000 |
| EP | 1348721 | 10/2003 |
| GB | 1510339 | 5/1978 |
| WO | 01/85803 | 11/2001 |
| WO | 03/011920 | 2/2003 |
| WO | 2004/106388 | 12/2004 |
| WO | 2006/082007 | 8/2006 |

* cited by examiner

Fig. 1

PROCESS FOR THE POLYOLEFIN FINISHING

FIELD OF THE INVENTION

The present invention relates to a process to perform the finishing of polyolefins obtained from a gas-phase polymerization for the removal of oligomers and high hydrocarbons from the polyolefin granules.

In particular, the invention relates to a process for decreasing the amount of heavy hydrocarbons and oligomers contained in the polyolefin granules discharged from a gas-phase polymerization reactor, so as to decrease considerably the odor release from the polymer.

BACKGROUND OF THE INVENTION

The use of catalysts with high activity and selectivity of the Ziegler-Natta type and, more recently, of the metallocene type has led to the widespread use on an industrial scale of processes in which the olefin polymerization is carried out in a gaseous medium in the presence of a solid catalyst. An example of said gas-phase polymerization processes involves the use of a fluidized bed reactor wherein a bed of polymer particles is maintained in a fluidized state by the upward flow of a fluidizing gas.

During the polymerization fresh polymer is generated by catalytic polymerization of the monomers and the manufactured polymer is drawn off from the reactor to maintain the polymer bed at a constant volume. The fluidized bed, which comprises a bed of growing polymer particles and catalyst particles, is maintained in a fluidization state by the continuous upward flow of a fluidizing gas, which comprises the recycled gas stream and make-up monomers. Industrial processes employ a distribution plate to dispense the fluidizing gas to the polymer bed, the distribution plate acting also as a support for the bed when the supply of gas is cut off. The fluidizing gas enters the bottom of the reactor and is passed through the distribution plate to the fluidized polymer bed.

It is known that in the gas-phase (co)polymerization of olefins, the monomers and comonomers generally remain occluded in the porous polymer particles, in particular when the comonomers are α-olefins comprising from 4 to 8 carbon atoms. For instance, in the manufacture of linear low density polyethylene (LLDPE) 1-hexene is mainly used as a comonomer, while in the manufacture of high density polyethylene (HDPE) a relatively high polymerization temperature and a large amount of hydrogen used as a molecular weight regulator may promote secondary hydrogenation reactions, in particular forming organic compounds of a low volatility containing for instance, from 4 to 12 carbon atoms.

Moreover, the gas-phase polymerization of olefins can be carried out in the presence of inert gases, such as propane, isobutane, isopentane or other saturated aliphatic hydrocarbons, which have mainly the function of contributing to dissipate the heat generated inside the reactor from the polymerization reaction. Even these alkanes of low volatility may remain occluded and dissolved in the porous polyolefins particles.

For safety, economical and ecological reasons, there is the need to remove the unreacted (co)monomers, the organic compounds and alkanes of relatively low volatility from the produced polyolefin. All these compounds constitute a load on the environment, some of them are capable of forming explosive mixtures in the presence of atmospheric oxygen. Unconverted monomers represent also a risk of prolongation of uncontrolled residual polymerization outside the polymerization reactor.

Another drawback associated with the presence of unconverted monomers, alkanes and oligomers inside the produced polyolefin is given by the development of bad smell, which hinders the marketing of the molded articles in food and pharmaceutical applications. In a particular way, the presence in the polyolefin of oligomers, saturated and unsaturated hydrocarbons with more than 5 carbon atoms, such as for instance 1-hexene and hexane, is responsible of bad smell development. The content of these components has therefore to be drastically reduced especially in case the produced polyolefin is aimed to be molded for manufacturing items for food applications.

EP 808850 discloses a method of reducing the odor development in olefinic polymers obtained by means of a metallocene catalyst in a gas-phase polymerization process. According to the teaching of this patent the ligands having a cyclopentadienyl skeleton are sources of odor development and they can be efficiently removed by a method including a step of contacting the polyolefin with a ligand decomposer, such as water or alcohol, to decompose the residual ligands contained in the polyolefin and then a step of removing the decomposed ligands by heating said polyolefin.

EP 1348721 relates to ethylene copolymerization for producing an ethylene copolymer having a low content of components that might generate odors or components that might change the taste of foods. The disclosed process comprises the gas-phase polymerization by means of a metallocene catalyst in a fluidized bed reactor with a saturated aliphatic hydrocarbon existing in the reactor in a concentration of 2 to 30% by mol. The copolymer powder withdrawn by the reactor is then subjected to a ligand-decomposing step contacting the polyolefin with water, oxygen or alcohols and then to a ligand-removing step by heating said copolymer.

U.S. Pat. No. 6,218,504 relates to a process to deodorize polyolefins and also to the use of deodorized polyolefin granules to produce plastic moldings with a low taste-impairment and odor-impairment. The process contemplates the use of a specific apparatus, wherein a gaseous mixture of steam and air, or a gaseous mixture of steam and nitrogen, or alternatively pure steam is passed around the polyolefin granules at a temperature preferably in the range from 90° C. to 130° C., with an amount of steam from 0.3 to 2.0 Kg per kg of polyolefin granules. U.S. Pat. No. 5,376,742 discloses the recovery of unreacted monomers from a polymer product coming from a fluidized bed reactor, and employing such recovered gases to purge the unreacted monomers from the polymer product. Ethylene is catalytically copolymerized with a $C_3$-$C_8$ olefin in a fluidized bed reactor in the presence of nitrogen as the reaction diluent. The obtained ethylene copolymer is counter-currently contacted with a gaseous stream comprising mostly ethylene and nitrogen to produce a copolymer having a reduced content of unreacted monomers. Said gaseous stream comprising mostly ethylene and nitrogen is derived from the cooling of the reaction gas mixture, which causes a partial condensation of the unreacted $C_3$-$C_8$ olefin comonomers and the simultaneous formation of a gaseous stream enriched in ethylene and nitrogen. The disadvantage correlated with the use of a gaseous stream comprising a major part of ethylene, as the purge gas for degassing the polymer, is the potential for further reaction of the still active polymer powder present inside the degassing vessel. If allowed to occur, this may lead to form agglomerates in the degassing vessel and a change in powder physical properties.

The disclosure of WO 03/011920 is aimed to solve the above mentioned problem by the removal of substantially all the monomers, for example ethylene, from the gaseous stream prior its use in the degassing vessel. According to the teaching of this patent the gaseous stream coming from the reactor, before its use as stripping agent in the degassing vessel, is passed to a first recovery unit for removing the heavy hydrocarbons, typically those comprising from 5 to 8 carbon atoms, which are especially used in the manufacture of LLDPE. After the removal of the heavy hydrocarbons, carried out for instance by refrigeration, the gaseous stream is passed to an ethylene recovery unity, so that the degassing stream entering the degassing vessel is advantageously enriched in nitrogen and substantially free of ethylene and comonomers, thus reducing the risk of further uncontrolled polymerization inside the degassing vessel. A disadvantage of this technique is that the gas is directly taken from the recycle line of the reaction gas to the reactor and fed back to it after the degassing. Therefore the degassing cycle is highly dependent on the conditions, particularly the pressure, in the reactor.

EP 683176 relates to a process for the continuous manufacture of ethylene (co)polymers by gas-phase catalytic copolymerization, the process leading to a decrease of the amount of undesirable volatile organic compounds in the obtained ethylene copolymers. After the transfer of the reactor effluent to a depressurization zone to achieve a raw separation of the solid phase from the gas phase, the solid phase is subjected to a multistage stripping process by means of (1) at least one non-deactivating flushing with a gas mixture which is substantially free from any poison to the active catalytic residues, and subsequently (2) a deactivating flushing with a gaseous mixture of nitrogen, water and oxygen.

The gaseous mixture used to carry out the above non-deactivating flushing (1) may be chosen from nitrogen, the gaseous reaction mixture and one or more of the constituents of said gaseous reaction mixture, preferably mixed with nitrogen. It is preferred the use of the gaseous mixture circulating in the polymerization reactor. The gaseous mixture used to carry out the deactivating flushing (2) essentially contains nitrogen and very low amounts of water or oxygen. Water is used in an amount of from 50 to 4000 ppm by weight relative to the flushed copolymer. Oxygen is used in an amount of from 5 to 1000 ppm by weight relative to the flushed copolymer. Accordingly, due to such a poor amount, water or oxygen have essentially the function of deactivating the catalytic residues in the ethylene copolymer, while nitrogen is the only stripping agent for decreasing the content of volatile organic components in the polyolefin. The process of EP 683176 is a double-stage stripping which requires the use of high amounts of nitrogen: this technique is very costly, since high amounts of nitrogen have to be heated to a high temperature to ensure the stripping efficiency. In particular, the technique described in this patent is particularly burdensome for all the gas-phase polymerization processes carried out in the absence of $N_2$ and using a saturated aliphatic hydrocarbon as the polymerization inert.

It would be desirable to overcome the drawbacks correlated with the use of unconverted monomers and/or nitrogen in the polymer degassing, when a high efficiency of removal of oligomers and hydrocarbons from the polyolefin granules is required.

The Applicant has now found a process for decreasing considerably the odor development from polyolefin granules obtained by a gas-phase polymerization, which is operated in the presence of a saturated aliphatic hydrocarbon.

SUMMARY OF THE INVENTION

It is therefore an object of the present invention a process to perform the finishing of polyolefins produced by gas-phase catalytic polymerization of one or more α-olefins in the presence of a polymerization diluent selected from a $C_3$-$C_5$ alkane, wherein the polyolefin granules discharged from the gas-phase reactor are subjected to:
(1) a first degassing step in which said polyolefin is counter-currently contacted with a gaseous stream containing at least 85% by mol of a stripping agent selected from a $C_3$-$C_5$ alkane, said gaseous stream being continuously derived from the monomer recovery section of the polymerization plant;
(2) a second degassing step in which said polyolefin is counter-currently contacted with steam, the amount of steam being from 10 to 200 Kg per 1000 kg of polyolefin.

DETAILED DESCRIPTION OF THE INVENTION

The purpose of the present invention is to achieve a very efficient removal of oligomers and those heavy hydrocarbons, present in polyolefin granules discharged from a gas-phase polymerization reactor and responsible of odor development. In particular, the target of the present invention is to reduce the total concentration by weight of oligomers and hydrocarbons higher than $C_5$ (i.e. with more than 5 carbon atoms) in the degassed polyolefin at a value of less than 50 ppm by weight, so that the polyolefin can be successively employed to manufacture plastic items for food and pharmaceutical applications, without incurring in unpleasant development of bad smell.

Oligomers are organic compounds always present as a by-product of a polymerization reaction. An oligomer can be also defined as a low molecular weight polymer in which the number of repeating units is approximately between 3 and 15.

The gas-phase polymerization reactor can be any type of gas-phase reactor, for example either a gas-phase fluidized-bed reactor or a stirred gas-phase reactor. For the purposes of the process of the invention, it is important that most of the reaction fluid is in the gaseous state and the polymer is in particulate form. Also a gas-phase polymerization apparatus having two distinct interconnected polymerization zones, as described in EP 782587 and EP 1012195, can be suitably used.

The discharge from the reactor is achieved by means of the pressure gradient prevailing between the reactor and a downstream degassing vessel. The separation of the polymer particles discharged from the reactor from the major part of the discharged gas can be carried out together with or separately from the degassing of the polymer particles, either in terms of time or in terms of space. For example, the separation of the solid particles from the gas can be carried out in a first vessel and the stripping with the gaseous stream containing at least 85% by mol of a $C_3$-$C_5$ alkane can be carried out subsequently in a second vessel. As an alternative, in the case of discontinuous discharge, the major part of the reaction gas can firstly be separated off from the particles and the polymer degassing can subsequently be carried out in the same vessel. However, the separation of the polymer from the major part of the discharged gas and the polymer degassing are preferably effected simultaneously and/or in the same place. Both said operative steps are preferably carried out immediately after the discharge of polyolefin from the reactor in one degassing vessel.

The positive results of the present invention in term of reducing the odor development are achieved by subjecting the polyolefin granules coming from a gas-phase polymerization reactor to a double stage treatment of stripping by means of two different stripping agents.

The first stripping agent is selected from a $C_3$-$C_5$ alkane, while the second one is steam.

The first degassing step (1) of the invention is carried out in a first degassing vessel downstream the polymerization reactor: the polyolefin granules are introduced in the upper portion of said vessel and fall down by gravity contacting in a counter current a gaseous stream introduced at the bottom of the degassing vessel. Said gaseous stream contains at least 85% by mol, preferably more than 95% by mol, of a stripping agent selected from a $C_3$-$C_5$ alkane or mixtures thereof. Preferably, said stripping agent is the same $C_3$-$C_5$ alkane which is used as the polymerization diluent in the gas-phase polymerization reactor.

To provide a sufficient amount of said $C_3$-$C_5$ alkane for degassing the polyolefin, the content of said alkane in the reaction gas should be 30% mol or more. As an alternative, an additional line with make-up alkane can be provided upstream of the degassing vessel, but this is less advantageous.

The use of a $C_3$-$C_5$ alkane instead of nitrogen as the polymerization diluent, is particularly advantageous. When nitrogen is completely replaced by an aliphatic hydrocarbon, the specific heat capacity of the recycle gas is maximized, as a result of which the recycle gas volume flow necessary for removing the heat of polymerization can be minimized. Accordingly, it is possible to make peripheral apparatuses such as compressors, heat exchangers, recycle gas line, etc. smaller or increase the polymer output. The heat removal from the gas-phase reactor can be carried out by circulating the reaction gas in the non-condensed mode. It may be also advantageous partly condensing the reaction gas and recirculating the condensate together with the uncondensed gas, so that the polymerization reactor is operated in the condensed mode.

Propane is preferably used as the polymerization diluent and the stripping agent in the process of the present invention, especially in the case of ethylene (co)polymerization.

As a result of the stripping operated from the gaseous stream containing the $C_3$-$C_5$ alkane, a degassed polyolefin is continuously withdrawn from the bottom of the degassing vessel, the total content of oligomers and hydrocarbons heavier than the selected stripping agent being reduced at less than 2000 ppm by wt.

From the top of the degassing vessel a gas mixture enriched in unreacted monomers, comonomers, oligomers and heavy hydrocarbons is obtained. Said gas mixture purged off from the top of the degassing vessel is conveyed to the monomer recovery section of the polymerization plant to carry out the separation of a gas stream containing at least 85% by mol of the selected $C_3$-$C_5$ alkane. This means that, differently from some prior art techniques, the gaseous stream used as the stripping agent in the present invention is not derived from the recycle gas line of the gas-phase reactor, but on the contrary, is continuously obtained as a stream derived and separated from the monomer recovery section of the polymerization plant.

Said gas stream containing at least 85% by mol of a $C_3$-$C_5$ alkane may be obtained by a sequence of purification steps with the aim of separating said $C_3$-$C_5$ alkane from the main olefin monomer, the optional comonomers, the oligomers and all the other saturated aliphatic hydrocarbons.

Conventional separation methods are employed for separating off the $C_3$-$C_5$ alkane in the monomer recovery section. Examples of separation techniques which may be employed are separation by distillation or by means of selectively permeable membranes, without the invention being restricted to these. Rather, it is possible to use any separation unit to achieve the advantages of the process of the invention, on condition that the purity according to the invention (higher than 85% mol) of the alkane $C_3$-$C_5$ in the stripping stream of step (1) can be achieved. Preference is given to separation by distillation.

Both the unconverted monomers and the saturated aliphatic hydrocarbons with a number of carbon atoms higher than the selected $C_3$-$C_5$ alkane, may be removed using a distillation column, a suitable permeable membrane, pressure swing adsorption (PSA), refrigeration or other suitable separation processes. Between these components, especially 1-hexene may be present in the gas mixture purged off from the top of the degassing vessel. If the removal of the above monomers and hydrocarbons is by refrigeration, they may be returned as a liquid to the gas recycle line of the polymerization reactor by means of a pump. If the removal of the above monomers and hydrocarbons is by means of a permeable membrane, these compounds are returned as a gas stream to the gas recycle line of the polymerization reactor.

The unconverted monomers and saturated aliphatic hydrocarbons with a number of carbon atoms lower than the selected $C_3$-$C_5$ alkane, such as ethylene, ethane and/or propylene, may be removed from the gas mixture purged off from the top of the degassing vessel by similar separation techniques to those utilized for the heavy hydrocarbons, i.e. by use of a suitable membrane, a distillation column, etc.

According to a preferred embodiment of the invention, in a first separation unit, configured as a distillation column, a low-boiling fraction containing the saturated and unsaturated hydrocarbons with a number of carbon atoms $C_n$ lower than the selected $C_3$-$C_5$ alkane is separated off and conveyed from the top of said distillation column to the recycle gas line of the reactor.

The high-boiling fraction in the bottom of the first separation column is enriched in the selected alkane $C_3$-$C_5$, oligomers, unreacted monomers and hydrocarbons with carbon atoms Cn higher than the selected $C_3$-$C_5$ alkane. This high-boiling fraction is fed to a second separation unit configured as a distillation column. Said second distillation column is operated in such a way that a gaseous mixture containing at least 85% by mol of the selected $C_3$-$C_5$ alkane is obtained at the top of the column, while all the heavier hydrocarbons are present and can be withdrawn from the bottom column. The gaseous stream obtained from the top of said second distillation column is therefore fed in continuous to the first stripping step (1) of the invention at the bottom of the degassing vessel.

In an alternative embodiment the working of the distillation columns can be inverted. The first column is operated in such a way that a high boiling fraction containing the 1-olefins and saturated hydrocarbons with $C_n$ higher than the selected $C_3$-$C_5$ alkane is separated as the bottom product of the column. On the other hand, a low boiling fraction containing the selected $C_3$-$C_5$ alkane and all the lower hydrocarbons can be obtained from the top of said column. As a consequence, said low boiling fraction can be fed to a second separation column to carry out the further separation of the stripping agent ($C_3$-$C_5$ alkane) from hydrogen and the lower hydrocarbons, such as ethylene, ethane.

Since the degassing cycle is part of the monomer recovery section and is not directly linked to the gas recycle line of the polymerization reactor, the pressure in the degassing cycle can be set to higher values than the pressure existing in the polymerization reactor. This is another advantage of the process of the present invention.

The temperature in the first degassing step (1) can be adjusted at a value from 60 to 120° C., while the pressure can range from 0.1 to 0.4 MPa, preferably from 0.15 to 0.35 MPa.

The residence times of the polymer in the first degassing vessel are between 10 minutes and 6 hours, preferably from 60 minutes to 3 hours.

In the first degassing step the polyolefin is freed of the major part of the gas carried with it by the action of the stripping agent $C_3$-$C_5$ alkane. As said, the presence in the polyolefin of oligomers, saturated and unsaturated hydrocarbons with more than 5 carbon atoms, such as for instance 1-hexene and hexane, is responsible of bad smell development. At the outlet of the first degassing step the total content of these components adsorbed on the polymer particles is reduced at less than 2000 ppm by wt. Of course, the $C_3$-$C_5$ alkane used as the stripping agent remains adsorbed on the polymer particles.

The degassed polymer is subsequently taken from the degassing vessel by means of rotary feeders and conveyed to the second degassing step (2) of the present invention, where the polyolefin is counter-currently contacted with steam as the stripping agent. The polyolefin granules are introduced in the upper portion of a second degassing vessel and fall down by gravity contacting in a counter current a stream of steam introduced at the bottom of the degassing vessel.

Steam is used to this purpose in an amount from 10 to 200 Kg per 1000 kg of polyolefin to be treated. This relatively high amount gives evidence that steam has not only the function of deactivating the catalyst components, in particular the organo-aluminum compounds of the catalyst system, but also the function of removing from the polyolefin granules the adsorbed propane and, above all, those odor developing components, i.e. oligomers and heavy hydrocarbons, not completely removed and stripped during the first degassing step.

Steam is introduced at the bottom of the degassing vessel and is withdrawn from the top of the vessel enriched in propane, oligomers and heavy organic compounds. The temperature in the second degassing step can be adjusted at a value from 80 to 120° C., preferably 95-110° C. The pressure can range from 0.1 to 0.35 MPa, preferably from 0.12 to 0.25 MPa.

The residence times of the polymer in the second degassing vessel are between 10 minutes and 4 hours, preferably from 90 minutes to 3 hours.

At the outlet from the second degassing vessel the total amount of oligomers and hydrocarbons adsorbed on the polymer particles is reduced at the value of less than 50 ppm, preferably less than 20 ppm by wt.

Steam partially condensates on contact with the polyolefin powder, so that wet polyolefin particles are discharged from the bottom of the second degassing vessel. As a consequence, a drying step has to be carried out downstream this degassing step in order to remove water from polyolefin particles. Hot nitrogen is preferably used to remove water from the polymer.

According to a preferred embodiment, the drying of the polymer powder is carried out firstly in the line connecting the second degassing vessel to a storage tank and then inside said storage tank by means of a hot nitrogen closed loop. A flow of hot nitrogen at a temperature in the range from 60 to 120° C. is used to convey the polymer particles from the second degassing vessel to the above storage tank, thus carrying out a first coarse drying of the polymer. The polymer drying is then efficiently completed by counter-currently contacting the polyolefin with hot nitrogen inside the storage tank. Hot pure nitrogen is fed at the bottom of the storage tank and a stream of nitrogen enriched with steam is discharged from the top of the tank. Said impure nitrogen stream is subjected to compression and successive cooling to condensate water, and after the steam condensate has been separated off in a liquid separator, the purified nitrogen is heated in a heat exchanger at the suitable temperature and again reintroduced at the bottom of the storage tank, thus forming a hot nitrogen closed loop. A portion of this purified and heated nitrogen is used as the carrier gas to convey the polyolefin, once discharged from the second degassing vessel.

The dried polyolefin discharged from the storage tank is ready to be subjected to extrusion to manufacture items suitable to be employed in food and pharmaceutical applications due to the extremely low content of organic compounds responsible of bad odor development.

According to the invention, the measurement of the content of oligomers and hydrocarbons in the degassed polyolefin is performed by means of the "static head-space" extraction method. Since 1-hexene is one of the organic compounds developing bad smell when adsorbed on polymer particles, the process of the present invention is particularly advantageous to be applied to copolymerization of ethylene with further 1-olefins, especially 1-hexene, in which ethylene is copolymerized in the presence of a catalyst in a gas-phase reactor to form polymer particles and the polymerization is carried out in the presence of propane as the polymerization inert.

Therefore, according to a preferred embodiment of the invention a process is provided to perform the finishing of polyolefins produced by a gas-phase catalytic polymerization of ethylene with further 1-olefins in the presence of propane as a polymerization diluent, wherein the polyolefin granules discharged from the gas-phase reactor are subjected to:

(1) a first degassing step in which said polyolefin is counter-currently contacted with a gaseous stream containing at least 85% by mol of propane as the stripping agent, said gaseous stream being continuously derived from the monomer recovery section of the polymerization plant;

(2) a second degassing step in which said polyolefin is counter-currently contacted with steam, the amount of steam being from 10 to 200 Kg per 1000 kg of polyolefin.

Figure 1:
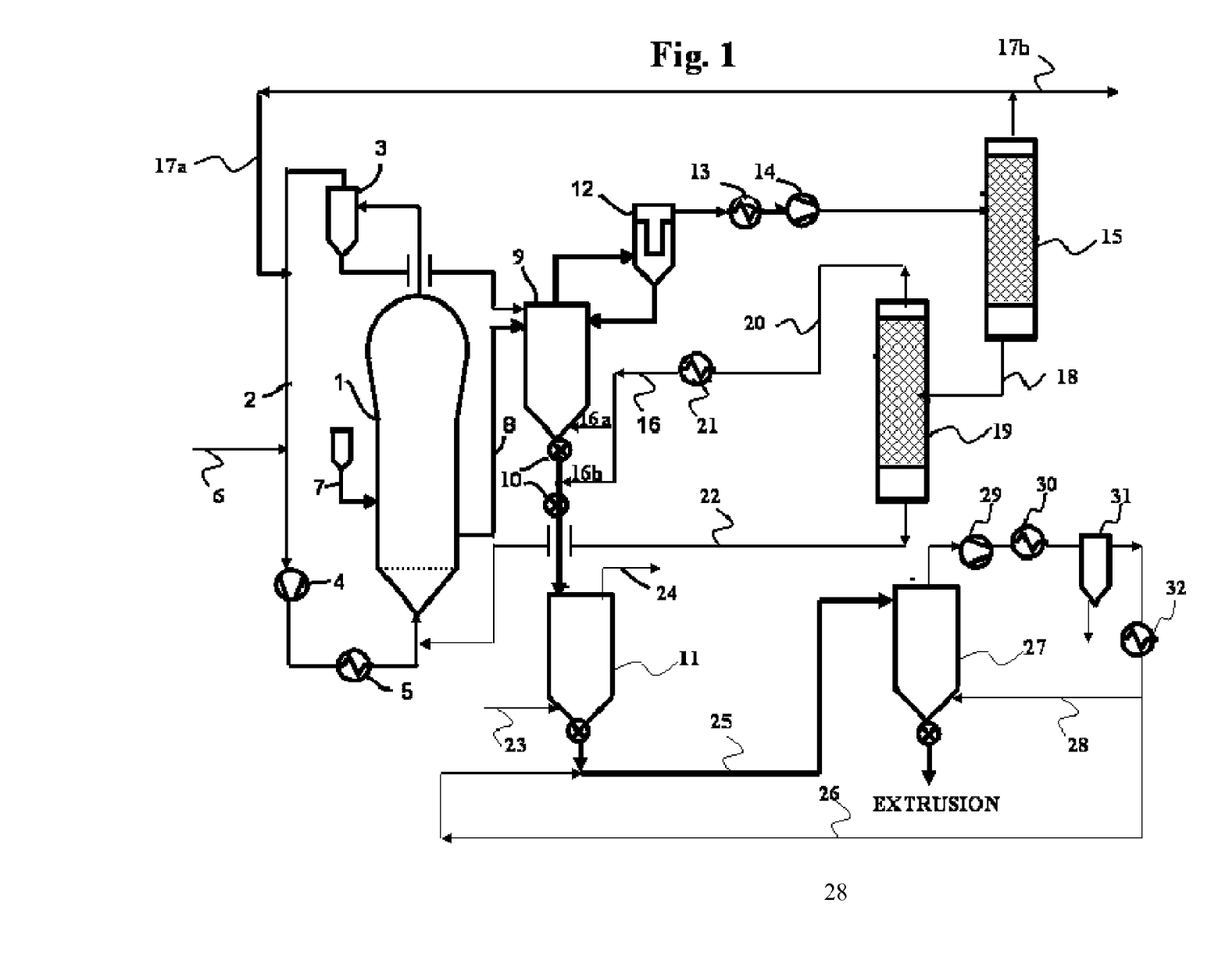
FIG. 1 is a flow diagram of a polymerization plant according to the invention.

The invention is illustrated below by way of example with the aid of a drawing showing a gas-phase fluidized-bed reactor used for the copolymerization of ethylene with 1-hexene, without the invention being restricted thereto.

FIG. 1 shows the flow diagram of a polymerization plant according to a preferred embodiment of the invention comprising a gas-phase fluidized-bed reactor 1, where a fluidized bed of polymer particles is kept in suspension in the gas phase by means of a upwardly gaseous stream. The upwardly velocity of the reaction gas has to be high enough to fluidize the mixed bed of polymer particles and secondly to remove the heat of polymerization effectively.

A gas distributor plate is placed at the bottom of the fluidized bed of polymer. At the top, the cylindrical part of the reactor is usually adjoined by a widening disengagement zone which reduces the discharge of solid particles from the reactor 1. The reaction gas leaves the reactor 1 at the upper end of the disengagement zone and is conveyed in the recycle gas line 2 via a cyclone 3 having the function of separating fine particles entrained with the gas. The recycle gas is conveyed via line 2 to the compressor 4 and then to a heat exchanger 5, in which the recycle gas is cooled back to the reactor 1. The recycle gas can, if appropriate, be cooled to below the gas mixture dew point in the heat exchanger 5 so as to operate the fluidised bed reactor 1 in the condensed mode.

When the apparatus is used for the polymerization of ethylene, the circulated reaction gas (recycle gas) comprises a mixture of ethylene, if desired a molecular weight regulator such as hydrogen, propane and/or further saturated hydrocarbons such as ethane, butane, isopentane. In addition, depending on the catalyst, further additives and auxiliaries such as metal alkyls, antistatics, catalyst poisons, etc., can also be used. Moreover, the reaction gas can further comprise $C_3$-$C_8$-1-olefins such as propylene, 1-butene, 1-pentene, 2-methylpentene, 1-hexene, 1-heptene and 1-octene as comonomers. Preference is given to a process in which ethylene is copolymerized with 1-hexene or 1-butene. To set constant reaction conditions, the constituents of the reaction gas can be fed into the gas-phase fluidized-bed reactor either directly or via the circulated reaction gas. In FIG. 1 fresh monomers, comonomers, and propane as the polymerization inert are fed to the fluidised bed reactor 1 via one or more feeding lines 6 merging into the recycle gas line 2.

The capacity of the gas-phase fluidized-bed reactor 1 is known to be limited by the cooling capacity of the circulated reaction gas. The cooling capacity is dependent not only on the heat capacity, i.e. the chemical composition, of the reaction gas but also, inter alia, on the pressure of the reaction gas or at which the (co)polymerization is carried out. Here, it is generally advisable to work at pressures of from 0.1 to 10 MPa, preferably from 1 to 8 MPa, particularly preferably from 1.5 to 5 MPa. The cooling capacity also depends on the reactor temperature at which the (co)polymerization in the fluidized bed is carried out. For the purposes of the process of the invention, it is advantageous to work at temperatures of from 50 to 125° C., preferably from 70 to 120° C., with temperatures in the upper part of this range preferably being set for copolymers of relatively high density and temperatures in the lower part of this range preferably being set for copolymers of relatively low density.

The catalyst or catalysts is/are introduced into the fluidised bed of polymer via one or more catalyst metering devices 7. As catalysts, it is possible to use all known types of catalyst which are suitable for olefin polymerization. Particular mention may be made of Ziegler catalysts, chromium-based Phillips catalysts and single-site catalysts, in particular metallocene catalysts, without being restricted thereto. For the purposes of the present invention, single-site catalysts comprise, unlike chromium and Ziegler/Natta catalysts, at least one defined organometallic transition metal compound and usually further activating compounds and, if appropriate, support and also further additives and auxiliaries. The catalysts can be immobilized together on a support or can be metered separately into the reactor.

Depending on the catalyst used, the polymer particles usually have a mean size of from a few hundred to a few thousand microns. In the case of chromium catalysts, the mean particles have a size of from about 400 to 600 μm, and in the case of Ziegler catalysts the mean particle size is about 900-3000 μm.

The polymer particles are withdrawn from the reactor 1 via one or more discharge lines 8. The product can be discharged continuously or discontinuously, with the continuous discharge being preferred. According to the first step of the process of the invention the discharged polyolefin powder is introduced in the upper portion of a degassing vessel 9 and falls down by gravity contacting in a counter current a gaseous stream introduced at the bottom of the degassing vessel 9. According to the invention said gaseous stream contains at least 85% by mol of a $C_3$-$C_5$ alkane. In the preferred embodiment shown in FIG. 1 said alkane is propane, which is also used as the polymerization diluent in the gas-phase fluidized bed reactor 1.

The polymer is freed of the major part of the gas adsorbed thereon in the degassing vessel 9. The degassing by means of a gaseous stream containing at least 85% of propane reduces the residual content of 1-olefins, such as 1-hexene, and relatively non-volatile inert gases, for example hexane, adsorbed on the polymer particles. The degassed polymer particles are subsequently withdrawn from the degassing vessel 9 by means of the rotary feeders 10 and conveyed to the second degassing step of the invention carried out by the use of steam.

To prevent steam from travelling back from the second degassing vessel 11 into the degassing vessel 9, a further line 16*b* feeding the gas stream containing propane can be placed between the two rotary feeders 10, thus acting as a barrier gas.

The gas which has been freed of the polymer particles in the degassing vessel 9, which normally contains considerable amounts of entrained fine dust, is passed to a recycle gas filter 12 in which the gas is largely freed of the fine dust. The purified gas is cooled in a heat exchanger 13 and is compressed in a compressor 14 before to be subjected to a two-stage separation by distillation.

In a first separation unit, configured as a separation column 15, a low-boiling fraction containing ethylene, preferably consisting essentially of ethylene, ethane, propane and possibly further low-boiling recycle gas components like hydrogen, is separated off and conveyed from the top of the column 15 via the gas return line 17*a* to the recycle gas line 2. This ensures minimization of the ethylene losses via the discharge system, since the ethylene goes back to the polymerization circuit.

To avoid accumulation in the circuit of ethane, which is present in the fresh ethylene stream and/or is generated as a by-product during polymerization, ethane is bled off via the ethane purge line 17*b*. The ethane discharged can be fed directly as feed to a cracker. Together with the ethane further undesirable by-products otherwise accumulating in the circuit can be removed.

The bottoms from the first separation column 15 which are enriched in relatively high-boiling hydrocarbons, consisting essentially of propane, the other 1-olefins and saturated hydrocarbons, are fed via a connecting line 18 to a second separation unit configured as a separation column 19. Essentially pure propane is obtained at the top of this second separation column 19, while all heavier hydrocarbons are present in the bottoms. The column is designed so that the content of higher hydrocarbons such as 1-hexene, 1-butene or n-hexane is preferably less than 0.1 mol % and that of ethylene is less than 1 mol %.

In an alternative embodiment not shown in FIG. 1 the separation columns can be exchanged. In this way the high boiling fraction containing the further 1-olefins and alkanes having 4 to 12 carbon atoms is separated in the first stage and afterwards the top product (distillate) is split into a clean propane fraction and the low boiling fraction containing ethylene and ethane.

The design of columns is generally known to those skilled in the art. In particular, the amount of propane obtained can be set in a simple manner via the power of the vaporizer of the second separation column or by a valve located between the second distillation column 19 and the degassing vessel 9. The purity of the propane in respect of ethylene can be influenced by the power of the vaporizer of the first column, while the content of higher hydrocarbons in the propane is adjusted via the reflux ratio in the second separation column 19. The temperature of the bottom product in the second separation column 19 should be below 120° C. in order to allow utilising low pressure steam as heating medium and to avoid ongoing reaction with 1-olefins.

The propane which has been purified in this way is conveyed via the propane line 20 to the heat exchanger 21, heated to a temperature which is from 5 to 20° C. below the softening point of the polymer, preferably to about 100° C., and subsequently fed via line 16 and successive line 16a into the degassing vessel 9. In the degassing vessel 9 the primary degassing of the polymer particles is carried out and the stripping loop is closed.

The low content of hexene in the gas stream containing propane ensures degassing of the polymer to a low residual hexene content, thus reducing the risk of odor development in the degassed ethylene copolymer. The low content of ethylene in the gas stream containing propane prevents appreciable after-polymerization and thus the formation of oligomers (gels). Particularly the quality of film products is highly decreased by such gels.

The use of the propane used for removal of the heat of polymerization as inert gas for the degassing of the polymer also makes it possible to achieve a high degree of recovery both of the ethylene and of the degassing agent, which is advantageous both from an economic point of view and from an ecological point of view. Furthermore, propane has a significantly greater heat capacity than nitrogen, which increases the heat discharge.

The 1-hexene and any hexane enriched in the bottoms from the second separation column 19 is/are conveyed via line 22 to the recycle gas line 2 and thus recirculated to the reactor 1. The small losses of propane which occur despite the use of the process of the invention are compensated by introduction of appropriate amounts of fresh propane into the recycle gas line 2 via line 6. Alternatively, particularly if Ziegler Catalyst used, the propane may have its source from that used for catalyst preparation and/or for catalyst feeding.

The fine dust separated off from the reaction gas in the cyclone 3 is advantageously added to the product in the degassing vessel 9 or alternatively fed back into the reactor 1. The polyolefin granules withdrawn by the degassing vessel 9 by the rotary feeders 10 are conveyed to a second degassing vessel 11, wherein the polyolefin particles fall down by gravity contacting in a counter current a stream of steam introduced via line 23 at the bottom of the degassing vessel 11.

Steam enriched in propane, oligomers and heavy organic compounds is discharged via line 24 from the top of the degassing vessel 11. Steam can be condensate through refrigeration, thus obtaining a hydrocarbons stream that can be recovered as off-gas.

Steam partially condensates on contact with the polyolefin granules, so that a wet polyolefin is discharged via line 25 from the bottom of the second degassing vessel 11.

A flow of hot nitrogen coming from line 26 is used to convey the polymer powder through the pipe 25 connecting the second degassing vessel 11 to a storage tank 27, thus carrying out a first coarse drying of the polyolefin. In the storage tank 27 the polymer is counter-currently contacted a flow of hot nitrogen which is introduced via line 28 at the bottom of the storage tank 27. From the top of the storage tank 27 a stream of nitrogen enriched with steam is obtained, which is subjected to compression in compressor 29 and successive cooling in heat exchanger 30 to condensate the steam. The condensed steam is separated off in a liquid precipitator 31, while the purified nitrogen is heated in a heat exchanger 32 at the suitable temperature and again reintroduced via line 28 at the bottom of the storage tank 27, thus forming a hot nitrogen closed loop. Part of the purified nitrogen enters line 26 to reach the discharge zone of the second degassing vessel 11. The dried polyolefin discharged from the storage tank 27 is then subjected to extrusion.

It may be emphasized that the specific embodiment described in FIG. 1 merely serve to illustrate the invention and do not constitute a restriction. In particular, the process of the invention to deodorize polyolefin granules can also be successfully applied not only to ethylene polymerization, but also to gas-phase polymerization of other alpha-olefins, as long as the stripping agent of the first degassing step is selected from a C3-C5 alkane and steam is used as the stripping agent of the second degassing step.

The following examples will further illustrate the present invention without limiting its scope.

EXAMPLES

Characterization

Melt index E (MIE): ASTM-D 1238 (190° C./2.16 Kg)

Density (not annealed): ASTM-D 792

Measurement of the content of volatile organic compounds in the manufactured (co)polymers: it is performed according to the "static head-space" extraction method.

This method consists in heating a sample of 4 g of (co) polymer in an oven to a temperature of 130° C. for 60 minutes. Part of the gaseous phase released from the sample of polymer is then injected into a gas chromatography apparatus GC-MS Agilent 6890-5973N to detect the different organic compounds.

The measurement of the volatile organic compounds responsible of bad smell development, i.e. organic compounds containing more 5 carbon atoms, is expressed in micrograms per gram of (co)polymer, i.e. in parts per million (ppm) by weight.

Example 1

Polymerization Conditions

The preparation of a linear low density polyethylene (LLDPE) using 1-hexene as the comonomer is carried out in a fluidized bed reactor as shown in FIG. 1.

A Ziegler-Natta catalyst is used as the polymerization catalyst, comprising:

a titanium solid catalyst component prepared with the procedure described in WO 04/106388, Example 1, according to which ethylacetate is used as an internal donor compound;

a mixture of triisobutylaluminum (TIBAL) and diethyl aluminum chloride (DEAC) in a weight ratio of 7:1, used as the cocatalyst;

tetrahydrofuran as an external donor.

The above solid catalyst component is fed to a catalyst activation vessel, together with the cocatalyst and the external donor, the weight ratio cocatalyst/solid component being of 10, the weight ratio cocatalyst/external donor being of 7. The above catalyst components are pre-contacted in propane at a temperature of 50° C. for 60 minutes.

After leaving the activation vessel, the activated catalyst is fed to the fluidized bed reactor (reference 1 in FIG. 1) for the copolymerization of ethylene with 1-hexene in the presence of propane as a polymerization diluent. Hydrogen is used as the molecular weight regulator.

The ethylene/1-hexene polymerization is carried out at a temperature of 85° C. and a pressure of 2.5 MPa. The composition of the gaseous reaction mixture is: 30% mol of ethylene, 5% mol of 1-hexene, 5% mol of hydrogen and 60% mol of propane.

The obtained LLDPE copolymer shows a density of 0.919 g/cm$^3$, a melt index MIE 0f 1.0 g/10 min. The average diameter of the polymer particles is of about 1200 μm First Degassing Step 50 Kg/h of LLDPE powder are continuously discharged from the fluidized bed reactor and transferred to the top of a first degassing vessel (reference 9 in FIG. 1).

A gaseous stream containing 99% by mol of propane and 1% mol of ethylene is continuously introduced at the bottom of said degassing vessel. The polymer powders fall down by gravity along the degassing vessel, thus contacting in a counter current the gaseous stream containing 99% by mol of propane.

Propane enriched in oligomers and heavy hydrocarbons is obtained at the top of the first degassing vessel. Said gaseous mixture containing propane, oligomers and heavy hydrocarbons is then subjected to distillation in a sequence of two distillation columns (references 15 and 19 in FIG. 1) according to the embodiment of FIG. 1, so as to obtain the above mentioned stream containing 99% mol of propane, which is continuously introduced at the bottom of the first degassing step.

The first degassing step is operated at a temperature of 75° C. and a pressure of 0.25 MPa. The average residence time of the powder in the first degassing vessel is of 120 minutes.

The first degassing step operates a first substantial removal of the 1-hexene and all the hydrocarbons with more than 4 carbon atoms adsorbed on the polymer particles. The polymer particles are subsequently withdrawn from the first degassing vessel and conveyed to the second degassing step of the present invention.

Second Degassing Step

The polyolefin granules withdrawn by the first degassing vessel are conveyed to a second degassing vessel (reference 11 in FIG. 1), wherein the polyolefin particles fall down by gravity contacting in a counter current a stream of steam introduced at the bottom of the second degassing vessel.

The total flow rate of steam fed to the second degassing step is equal to 8 Kg/h, corresponding to 160 Kg of steam per 1000 kg of polyolefin to be treated. The second degassing step is operated at a temperature of 102° C. with a residence time of the polymer powder of 90 minutes.

Steam enriched in propane, oligomers and heavy organic compounds is discharged from the top of the second degassing vessel.

On the other hand, steam partially condensates on contact with the polyolefin granules, so that a wet polyolefin is discharged from the bottom of the second degassing vessel. After the discharge from the second degassing vessel, the LLDPE powder is dried by means of a flow of hot nitrogen in a dedicated storage tank (reference 27 in FIG. 1). Inside said storage tank the polymer is counter-currently contacted a flow of hot nitrogen at a temperature of 80° C. From the top of the storage tank a stream of nitrogen enriched with steam is obtained, which is subjected to compression and successive cooling to condensate and separate the steam. The purified nitrogen is heated in a heat exchanger and again reintroduced at the bottom of the drying storage tank, thus forming a hot nitrogen closed loop.

A sample of dried LLDPE powder discharged from the drying storage tank is subjected to the "static head-space" extraction method, in order to measure the residual content of volatile organic compounds adsorbed on the polymer particles.

The enclosed Table 1 indicates, in parts per million (ppm) by weight per gram of polymer, the residual amounts of organic compounds (oligomers and hydrocarbons) with more than 5 carbon atoms adsorbed on the polymer particles. In Table 1 ΣC6 indicates all the C6 hydrocarbons, i.e. saturated and non saturated, iso and n-C6; i-C8 indicates the iso-C8 hydrocarbons, and n-C8 indicates the normal C8 hydrocarbons.

As proven by the data of Table 1, the finishing process of the invention allows to reduce the total concentration by weight of oligomers and hydrocarbons higher than $C_5$ (i.e. with more than 5 carbon atoms) in the degassed polyolefin at a value of less than 50 ppm by weight: as a consequence, the obtained LLDPE powder can be suitably employed to manufacture plastic items for food and pharmaceutical applications, without incurring in unpleasant development of bad smell.

Example 2

Polymerization Conditions

The preparation of a middle density polyethylene (MDPE) using 1-hexene as the comonomer is carried out in a fluidized bed reactor as shown in FIG. 1.

A Ziegler-Natta catalyst is used as the polymerization catalyst, comprising:

a titanium solid catalyst component prepared with the procedure described in WO 01/85803, Example 7;
a mixture of triisobutylaluminum (TIBAL) and diethyl aluminum chloride (DEAC) in a weight ratio of 7:1, as the cocatalyst.

The above solid catalyst component is fed to a catalyst activation vessel, together with the cocatalyst, the weight ratio cocatalyst/solid component being of 10. The above catalyst components are pre-contacted in propane at a temperature of 20° C. for 65 minutes.

After leaving the activation vessel, the activated catalyst is fed to the fluidized bed reactor (reference 1 in FIG. 1) for the copolymerization of ethylene with 1-hexene in the presence of propane as a polymerization diluent. Hydrogen is used as the molecular weight regulator.

The ethylene/1-hexene polymerization is carried out at a temperature of 80° C. and a pressure of 2.5 MPa. The composition of the gaseous reaction mixture is: 17% mol of ethylene, 3% mol of 1-hexene, 3% mol of hydrogen and 77% mol of propane.

The obtained MDPE copolymer shows a density of 0.933 g/cm$^3$, a melt index MIE of 0.4 g/10 min. The average diameter of the polymer particles is of about 1300 μm First Degassing Step 60 Kg/h of MDPE powder are continuously discharged from the fluidized bed reactor and transferred to the top of a first degassing vessel (reference 9 in FIG. 1).

A gaseous stream containing 97% by mol of propane and 3% mol of ethylene is continuously introduced at the bottom of said degassing vessel. The polymer powders fall down by gravity along the degassing vessel, thus contacting in a counter current the gaseous stream containing propane.

Propane enriched in oligomers and heavy hydrocarbons is obtained at the top of the first degassing vessel. Said gaseous mixture containing propane, oligomers and heavy hydrocarbons is then subjected to distillation in a sequence of two distillation columns (references 15 and 19 in FIG. 1) according to the embodiment of FIG. 1, so as to obtain the above mentioned stream containing 97% mol of propane, which is continuously introduced at the bottom of the first degassing step.

The first degassing step is operated at a temperature of 75° C. and a pressure of 0.25 MPa. The average residence time of the powder in the first degassing vessel is of 100 minutes.

The first degassing step operates a first substantial removal of the 1-hexene and all the hydrocarbons with more than 4 carbon atoms adsorbed on the polymer particles. The polymer particles are subsequently withdrawn from the first degassing vessel and conveyed to the second degassing step of the present invention.

Second Degassing Step

The polyolefin granules withdrawn by the first degassing vessel are conveyed to a second degassing vessel (reference 11 in FIG. 1), wherein the polyolefin particles fall down by gravity contacting in a counter current a stream of steam introduced at the bottom of the second degassing vessel.

The total flow rate of steam fed to the second degassing step is equal to 5 Kg/h, corresponding to 83 Kg of steam per 1000 kg of polyolefin to be treated. The second degassing step is operated at a temperature of 103° C. with a residence time of the polymer powder of 75 minutes.

Steam enriched in propane, oligomers and heavy organic compounds is discharged from the top of the second degassing vessel.

On the other hand, steam partially condensates on contact with the polyolefin granules, so that a wet polyolefin is discharged from the bottom of the second degassing vessel. After the discharge from the second degassing vessel, the MDPE powder is dried by means of a flow of hot nitrogen in a dedicated storage tank (reference 27 in FIG. 1). Inside said storage tank the polymer is counter-currently contacted a flow of hot nitrogen at a temperature of 80° C. From the top of the storage tank a stream of nitrogen enriched with steam is obtained, which is subjected to compression and successive cooling to condensate and separate the steam. The purified nitrogen is heated in a heat exchanger and again reintroduced at the bottom of the drying storage tank, thus forming a hot nitrogen closed loop.

A sample of dried MDPE powder discharged from the drying storage tank is subjected to the "static head-space" extraction method, in order to measure the residual content of volatile organic compounds adsorbed on the polymer particles.

The data of Table 1 show that the total concentration by weight of oligomers and hydrocarbons higher than $C_5$ in the degassed MDPE is of less than 50 ppm by weight.

Example 3

Polymerization Conditions

The preparation of a linear low density polyethylene (LLDPE) using 1-butene as the comonomer is carried out in a fluidized bed reactor as shown in FIG. 1.

A Ziegler-Natta catalyst is used as the polymerization catalyst, comprising:
- a titanium solid catalyst component prepared with the procedure described in WO 04/106388, Example 1, according to which ethylacetate is used as an internal donor compound;
- a mixture of triisobutylaluminum (TIBAL) and diethyl aluminum chloride (DEAC) in a weight ratio of 7:1 as the cocatalyst;
- tetrahydrofuran as an external donor.

The above solid catalyst component is fed to a catalyst activation vessel, together with the cocatalyst and the external donor, the weight ratio cocatalyst/solid component being of 10, the weight ratio cocatalyst/external donor being of 7. The above catalyst components are pre-contacted in propane at a temperature of 50° C. for 60 minutes.

After leaving the activation vessel, the activated catalyst is fed to the fluidized bed reactor (reference 1 in FIG. 1) for the copolymerization of ethylene with 1-butene in the presence of propane as a polymerization diluent. Hydrogen is used as the molecular weight regulator.

The ethylene/1-butene polymerization is carried out at a temperature of 80° C. and a pressure of 2.5 MPa. The composition of the gaseous reaction mixture is: 35% mol of ethylene, 16% mol of 1-butene, 7% mol of hydrogen and 42% mol of propane.

The obtained LLDPE copolymer shows a density of 0.920 $g/cm^3$, a melt index MIE of 0.94 g/10 min. The average diameter of the polymer particles is of about 990 μm First Degassing Step 55 Kg/h of LLDPE powder are continuously discharged from the fluidized bed reactor and transferred to the top of a first degassing vessel (reference 9 in FIG. 1).

A gaseous stream containing 96% by mol of propane and 4% mol of ethylene is continuously introduced at the bottom of said degassing vessel. The polymer powders fall down by gravity along the degassing vessel, thus contacting in a counter current the gaseous stream containing 96% by mol of propane.

Propane enriched in oligomers and heavy hydrocarbons is obtained at the top of the first degassing vessel. Said gaseous mixture containing propane, oligomers and heavy hydrocarbons is then subjected to distillation in a sequence of two distillation columns (references 15 and 19 in FIG. 1) according to the embodiment of FIG. 1, so as to obtain the above mentioned stream containing 96% mol of propane, which is continuously introduced at the bottom of the first degassing step.

The first degassing step is operated at a temperature of 70° C. and a pressure of 0.26 MPa. The average residence time of the powder in the first degassing vessel is of 110 minutes.

The first degassing step operates a first substantial removal of 1-butene and the hydrocarbons with more than 4 carbon atoms adsorbed on the polymer particles. The polymer particles are subsequently withdrawn from the first degassing vessel and conveyed to the second degassing step of the present invention.

Second Degassing Step

The polyolefin granules withdrawn by the first degassing vessel are conveyed to a second degassing vessel (reference 11 in FIG. 1), wherein the polyolefin particles fall down by gravity contacting in a counter current a stream of steam introduced at the bottom of the second degassing vessel.

The total flow rate of steam fed to the second degassing step is equal to 8 Kg/h, corresponding to 145 Kg of steam per 1000 kg of polyolefin to be treated. The second degassing step is operated at a temperature of 101° C. with a residence time of the polymer powder of 80 minutes.

Steam enriched in propane, oligomers and heavy organic compounds is discharged from the top of the second degassing vessel.

On the other hand, steam partially condensates on contact with the polyolefin granules, so that a wet polyolefin is discharged from the bottom of the second degassing vessel. After the discharge from the second degassing vessel, the LLDPE powder is dried by means of a flow of hot nitrogen in a dedicated storage tank (reference 27 in FIG. 1). Inside said storage tank the polymer is counter-currently contacted a flow of hot nitrogen at a temperature of 80° C. From the top of the storage tank a stream of nitrogen enriched with steam is obtained, which is subjected to compression and successive cooling to condensate and separate the steam. The purified nitrogen is heated in a heat exchanger and again reintroduced at the bottom of the drying storage tank, thus forming a hot nitrogen closed loop.

A sample of dried LLDPE powder discharged from the drying storage tank is subjected to the "static head-space" extraction method, in order to measure the residual content of volatile organic compounds adsorbed on the polymer particles.

The data of Table 1 show that the total concentration by weight of oligomers and hydrocarbons higher than $C_5$ in the degassed LLDPE is of less than 50 ppm by weight.

Example 4 (Comparative)

The LLDPE powder (density 0.919 g/cm$^3$, MIE 1.0 g/10 min, average diameter 1200 μm) obtained as described in detail in Example 1, is subjected to a first degassing step with the operative conditions of the invention and a second degassing step, which uses nitrogen instead of steam as the stripping agent.

First Degassing Step

50 Kg/h of LLDPE powder of Example 1 are continuously discharged from the fluidized bed reactor and transferred to the top of a first degassing vessel.

A gaseous stream containing 99% by mol of propane and 1% mol of ethylene is continuously introduced at the bottom of said degassing vessel. The polymer powders fall down by gravity along the degassing vessel, thus contacting in a counter current the gaseous stream containing 99% by mol of propane.

Propane enriched in oligomers and heavy hydrocarbons is obtained at the top of the first degassing vessel. Said gaseous mixture containing propane, oligomers and heavy hydrocarbons is then subjected to distillation in a sequence of two distillation columns according to the embodiment of FIG. 1, so as to obtain the above mentioned stream containing 99% mol of propane, which is continuously introduced at the bottom of the first degassing step.

The first degassing step is operated at a temperature of 75° C. and a pressure of 0.25 MPa. The average residence time of the powder in the first degassing vessel is of 120 minutes.

Second Degassing Step

The polyolefin granules withdrawn by the first degassing vessel are conveyed to a second degassing vessel, wherein the polyolefin particles fall down by gravity contacting in a counter current a stream of nitrogen introduced at the bottom of the second degassing vessel.

The total flow rate of nitrogen fed to the second degassing step is equal to 30 Kg/h. Said second degassing step is operated at a temperature of 80° C. with a residence time of the polymer powder of 90 minutes.

A sample of LLDPE powder discharged from the second degassing vessel is subjected to the "static head-space" extraction method, in order to measure the residual content of volatile organic compounds adsorbed on the polymer particles.

The data of Table 1 show that the total concentration by weight of oligomers and hydrocarbons higher than $C_5$ in the degassed LLDPE is well above 50 ppm by weight, so that the polyolefin powder can give rise to undesirable development of bad smell when employed to manufacture plastic items for food and pharmaceutical applications.

TABLE 1

| | ΣC6 ppm | i-C8 ppm | n-C8 ppm | n-C10 ppm | n-C12 ppm | n-C14 ppm | n-C16 ppm |
|---|---|---|---|---|---|---|---|
| Example 1 | 8 | 4 | 0 | 8 | 12 | 8 | 2 |
| Example 2 | 2 | <1 | 0 | 2 | 3 | 2 | <1 |
| Example 3 | 5 | 2 | 0 | 4 | 6 | 4 | 3 |
| Example 4 (Comparative) | 360 | 80 | 4 | 31 | 9 | 4 | 2 |

The invention claimed is:

1. A process for finishing polyolefins produced by gas-phase catalytic polymerization of at least one α-olefin in presence of a polymerization diluent selected from a $C_3$-$C_5$ alkane, wherein polyolefin granules discharged from a gas-phase reactor are subjected to:
   (1) a first degassing step in which said polyolefin is counter-currently contacted with a gaseous stream comprising at least 85% by mol of a stripping agent selected from a $C_3$-$C_5$ alkane, said gaseous stream being continuously derived from a monomer recovery section of a polymerization plant;
   (2) a second degassing step in which said polyolefin is counter-currently contacted with steam, the amount of steam being from 10 to 200 Kg per 1000 kg of polyolefin.

2. The process according to claim 1, wherein said gas-phase reactor is selected from a fluidized-bed reactor, a stirred gas-phase reactor and a gas-phase apparatus comprising two distinct interconnected polymerization zones.

3. The process according to claim 1, wherein said gaseous stream comprises at least 95% by mol of the stripping agent.

4. The process according to claim 1, wherein the stripping agent is the same as the polymerization diluent in the gas-phase reactor.

5. The process according to claim 1, wherein propane is the polymerization diluent and the stripping agent.

6. The process according to claim 1, wherein said gaseous stream comprising the stripping agent is obtained by subjecting a gas mixture purged from the top of the first degassing step (1) to a sequence of separation steps in said monomer recovery section.

7. The process according to claim 6, wherein said separation steps are carried out by a method selected from distillation, permeable membranes, pressure swing adsorption (PSA), refrigeration, and combinations thereof.

8. The process according to claim 1, wherein the temperature in the first degassing step ranges from 60 to 120° C.

9. The process according to claim 1, wherein the pressure in the first degassing step ranges from 0.1 to 0.4 MPa.

10. The process according to claim 1, wherein the residence time in the first degassing step is between 10 minutes and 6 hours.

11. The process according to claim 1, wherein the temperature in the second degassing step ranges from 80 to 120° C.

12. The process according to claim 1, wherein the pressure in the second degassing step ranges from 0.1 to 0.35 MPa.

13. The process according to claim 1, wherein the residence time in the second degassing step is between 10 minutes and 4 hours.

14. The process according to claim 1, wherein at an outlet from a second degassing vessel, the total amount of oligomers and hydrocarbons adsorbed on the polymer particles is reduced at a value of less than 50 ppm by weight.

15. The process according to claim 1, wherein a drying step is carried out downstream from the second degassing step by means of hot nitrogen.

16. The process according to claim 15, wherein the drying step is carried out in a line connecting a second degassing vessel to a storage tank.

17. The process according to claim 15, wherein a flow of hot nitrogen at a temperature ranging from 60 to 120° C. is used to convey polymer particles from a second degassing vessel to a storage tank.

18. The process according to claim 16, wherein the drying step is carried out inside said storage tank by means of a hot nitrogen closed loop.

19. A process for finishing polyolefins produced by a gas-phase catalytic polymerization of ethylene with further 1-olefins in presence of propane as a polymerization diluent, wherein polyolefin granules discharged from a gas-phase reactor are subjected to:
(1) a first degassing step in which said polyolefin is counter-currently contacted with a gaseous stream comprising at least 85% by mol of propane as a stripping agent, said gaseous stream being continuously derived from a monomer recovery section of a polymerization plant;
(2) a second degassing step in which said polyolefin is counter-currently contacted with steam, the amount of steam being from 10 to 200 Kg per 1000 kg of polyolefin.

* * * * *